US009833819B2

(12) United States Patent
Burget

(10) Patent No.: US 9,833,819 B2
(45) Date of Patent: Dec. 5, 2017

(54) SYSTEM FOR DEEP UNDERGROUND STORAGE OF RADIOACTIVE WASTE

(71) Applicant: Safe Nuclear Solutions, LLC, Seabrook, TX (US)

(72) Inventor: John Burget, Seabrook, TX (US)

(73) Assignee: Safe Nuclear Solutions, LLC, Seabrook, TX (US)

( * ) Notice: Subject to any disclaimer, the term of this patent is extended or adjusted under 35 U.S.C. 154(b) by 203 days.

(21) Appl. No.: 15/092,522

(22) Filed: Apr. 6, 2016

(65) Prior Publication Data
US 2016/0293282 A1 Oct. 6, 2016

Related U.S. Application Data

(60) Provisional application No. 62/143,653, filed on Apr. 6, 2015.

(51) Int. Cl.
G21F 5/008 (2006.01)
G21F 5/12 (2006.01)
(Continued)

(52) U.S. Cl.
CPC ............... B09B 1/008 (2013.01); G21F 7/00 (2013.01); G21F 9/36 (2013.01); G21F 5/06 (2013.01)

(58) Field of Classification Search
CPC B09B 1/00; B09B 1/008; E02D 31/00; E02D 31/004; G21F 5/00; G21F 5/002; G21F 5/005; G21F 5/008; G21F 5/012; G21F 5/06–5/14; G21F 2005/125; G21F 9/22; G21F 9/24; G21F 9/34
(Continued)

(56) References Cited

U.S. PATENT DOCUMENTS 3,379,013 A 4/1968 Slagle et al.
3,866,424 A * 2/1975 Busey ................. F22B 1/02
122/32
(Continued)

FOREIGN PATENT DOCUMENTS

JP 10332894 A * 12/1998

OTHER PUBLICATIONS

Cary, North Dakota deep borehole test could help Hanford, Tri-City Herald Jan. 7, 2016 http://www.tri-cityherald.com/news/local/hanford/article53653470.html.
(Continued)

Primary Examiner — Benjamin Fiorello
Assistant Examiner — Stacy Warren
(74) Attorney, Agent, or Firm — Entralta P.C.; Justin G. Sanders; Peter D. Weinstein

(57) ABSTRACT

A system for the storage of a radioactive waste product, wherein the radioactive waste product is located in a container and where one or more containers are stored in a bore hole drilled beneath a surface and having a bottom, wherein following placement of the one or more containers in the bore hole closer to the bottom, a fluid is added to the bore hole to a height above the upper most container, and wherein an upper cover is located above the upper most container and above the fluid to seal in the one or more containers and a non-permeable material is placed above the upper cover, a container storage area being formed within the bore hole beneath the upper cover.

17 Claims, 5 Drawing Sheets

(51) Int. Cl.
  *G21F 5/14* (2006.01)
  *B09B 1/00* (2006.01)
  *G21F 7/00* (2006.01)
  *G21F 9/36* (2006.01)
  *G21F 5/06* (2006.01)

(58) Field of Classification Search
  USPC ... 405/129.1, 129.35, 129.45, 129.5, 129.55, 405/129.6, 129.75; 588/249, 250, 259, 588/260
  See application file for complete search history.

(56) References Cited

U.S. PATENT DOCUMENTS

| | | | |
|---|---|---|---|
| 4,178,109 A | 12/1979 | Krutenat | |
| 4,320,028 A | 3/1982 | Leuchtag | |
| 4,452,478 A | 6/1984 | Dulaney | |
| 4,500,227 A | 2/1985 | Courtois et al. | |
| 4,521,372 A * | 6/1985 | Price | G01M 3/226 250/507.1 |
| 4,636,475 A * | 1/1987 | Price | G01M 3/226 252/964 |
| 4,701,280 A * | 10/1987 | Canevall | G21F 9/34 376/261 |
| 4,708,522 A * | 11/1987 | Bergman | G21F 9/34 376/272 |
| 4,861,194 A * | 8/1989 | Lang | B09B 1/008 405/129.55 |
| 5,191,157 A | 3/1993 | Crocker | |
| 5,202,522 A | 4/1993 | Williams | |
| 5,338,493 A * | 8/1994 | Welch | G21F 9/34 405/129.3 |
| 5,489,739 A * | 2/1996 | Curry | G21F 9/34 220/900 |
| 5,678,235 A | 10/1997 | Crowe | |
| 5,733,066 A | 3/1998 | Myers | |
| 5,863,283 A | 1/1999 | Gardes | |
| 7,165,917 B2 | 1/2007 | Rode | |
| 2011/0054234 A1 * | 3/2011 | Georgii | B09B 1/008 588/17 |
| 2014/0309472 A1 * | 10/2014 | Yamamoto | G21F 9/36 588/17 |

OTHER PUBLICATIONS

Radioactive Waste Management (Updated Oct. 2015) Taken on Apr. 5, 2016 from http://www.world-nuclear.org/information-library/nuclear-fuel-cycle/nuclearwastes/radioactive-waste-management.aspx.

* cited by examiner

SYSTEM FOR DEEP UNDERGROUND STORAGE OF RADIOACTIVE WASTE

RELATED APPLICATIONS

This application claims priority pursuant to 35 U.S.C. §119(e) to and is entitled to the filing date of U.S. Provisional Patent Application Ser. No. 62/143,653 filed Apr. 6, 2015, and entitled "System for Extremely Deep Underground Storage of High Level Nuclear and Other Radioactive Waste with Maximum Environmental Safety." The contents of the aforementioned application is incorporated herein by reference.

BACKGROUND

With the onset of the nuclear age, there has been one question that has not been adequately resolved. In essence, what to do with the waste that builds up over time from the use of nuclear material. Though this issue has been around for more than sixty years, there is still no consensus on how to dispose of nuclear waste. To date, the majority of high level nuclear and other radioactive waste that has no useful components that could be reprocessed is expected to be stored as vitrified (glassified) material inside canisters or other such containers. This is expected to occur after reprocessing of spent reactor fuel, or after pre-treatment of wastes from nuclear weapons production, to remove both non-radioactive substances and radioactive ones which can be re-used as fissionable components of new reactor fuel.

Such vitrified radioactive waste is expected to be formed into large solid cylinders or containers which can probably be any length and diameter, depending on the specifications for their manufacture. Before storage or disposal in a permanent waste site these large containers will be clad with corrosion resistant metal so that subsequent unintended exposure to water, or other possibly corrosive liquids or gases, should not breach their integrity Cylinders or containers with unreprocessed spent nuclear fuel rods are now expected to be placed for final storage or disposal in tightly regulated, large underground land disposal sites that are usually within five hundred to a few thousand feet from the surface and may be located close to a water table. Specific details regarding storage locations, environmental barriers, site access controls and ongoing site monitoring for possible waste leakage appear to vary greatly among countries which already have radioactive waste storage or disposal programs. In fact, even in the United States, traces of stored radioactive material have been identified in water supplies located at or near such waste disposal sites.

To the extent that efforts at consolidated or manageable site disposal have occurred, these have generally failed to yield an answer. For instance, in the United States, the federal government spent billions of dollars building a waste disposal site at Yucca Mountain. Despite this investment, the site continues not to be used and a consensus continues to build that will likely result in the Yucca Mountain site not being the planned central repository. Indeed, a coordinated nuclear waste disposal plan is yet to be put forth.

As a result, there is a need for a waste disposal system that provides for the storage of radioactive waste products in a manner that is safe and monitorable and not likely to contaminate the surrounding environment, including, without limitation, water supplies used for personal or other purposes.

SUMMARY

In an aspect, the present invention includes, without limitation, a system for the storage of a radioactive waste product, wherein the radioactive waste product is located in a container and where one or more containers are stored in a bore hole, wherein following placement of the one or more containers in the bore hole, a liquid or a gas is added to the bore hole to a height greater than the upper most container and wherein a cover is located above the upper most container and above the liquid or gas to seal in the one or more containers and a non-permeable material is placed above the seal. In a further aspect, the present invention includes, without limitation, two or more containers stored in a bore hole.

In an aspect, the present invention includes, without limitation, a liquid added to the bore hole, wherein the liquid is water and the water is, without limitation, deionized water. In a further aspect, the present invention includes, without limitation, one or more sensors are located in the bore hole near one or more containers and wherein the one or more sensors detect, without limitation, an increase in radiation, a change in pH and/or electrical charge.

In an aspect, the present invention comprises a bore hole that has a diameter, without limitation, of at least 1 inch, 2 inches, 3 inches, 4 inches, 5 inches, 6 inches, 7 inches, 8 inches, 9 inches, 10 inches, 11 inches, 12 inches, 13 inches, 14 inches, 15 inches, 16 inches, 17 inches, 18 inches, 19 inches, 20 inches, 21 inches, 22 inches, 23 inches, 24 inches, 25 inches, 26 inches, 27 inches, 28 inches, 29 inches, 30 inches, 31 inches, 32 inches, 33 inches, 34 inches, 35 inches, 36 inches, 37 inches, 38 inches, 39 inches, 40 inches, 41 inches, 42 inches, 43 inches, 44 inches, 45 inches, 46 inches, 47 inches, 48 inches, 49 inches, 50 inches, 51 inches, 52 inches, 53 inches, 54 inches, 55 inches, 56 inches, 57 inches, 58 inches, 59 inches, 60 inches or more.

In an aspect, the present invention comprises, without limitation, a bore hole having a main shaft drilled vertical to the land surface or water surface and/or drilled first vertical to such surface and then having one or more additional branching shafts drilled horizontally from the main vertical shaft. In a further aspect, bore holes are drilled at an angle of at least 1° from the vertical, 2° from the vertical, 3° from the vertical, 4° from the vertical, 5° from the vertical, 6° from the vertical, 7° from the vertical, 8° from the vertical, 9° from the vertical, 10° from the vertical, 11° from the vertical, 12° from the vertical, 13° from the vertical, 14° from the vertical, 15° from the vertical, 16° from the vertical, 17° from the vertical, 18° from the vertical, 19° from the vertical, 20° from the vertical, 21° from the vertical, 22° from the vertical, 23° from the vertical, 24° from the vertical, 25° from the vertical, 26° from the vertical, 27° from the vertical, 28° from the vertical, 29° from the vertical, 30° from the vertical, 31° from the vertical, 32° from the vertical, 33° from the vertical, 34° from the vertical, 35° from the vertical, 36° from the vertical, 37° from the vertical, 38° from the vertical, 39° from the vertical, 40° from the vertical, 41° from the vertical, 42° from the vertical, 43° from the vertical, 44° from the vertical, 45° from the vertical, 46° from the vertical, 47° from the vertical, 48° from the vertical, 49° from the vertical, 50° from the vertical, 51° from the vertical, 52° from the vertical, 53° from the vertical, 54° from the vertical, 55° from the vertical, 56° from the vertical, 57° from the vertical, 58° from the vertical, 59° from the vertical, 60° from the vertical, 61° from the vertical, 62° from the vertical, 63° from the vertical, 64° from the vertical, 65° from the vertical, 66° from the vertical, 67° from the vertical, 68° from the vertical, 69° from the vertical, 70° from the vertical, 71° from the vertical, 72° from the vertical, 73° from the vertical, 74° from the vertical, 75° from the vertical, 76° from the vertical, 77° from the vertical, 78° from the vertical, 79° from the vertical, 80° from the vertical, 81° from the vertical, 82° from the vertical, 83° from the vertical, 84° from the vertical, 85° from the vertical, 86° from the vertical, 87° from the vertical, 88° from the vertical, 89° from the vertical, or 90° from the vertical.

In an aspect, a container of the present invention is constructed of, without limitation, a metal, a plastic, a fiber or a composite, wherein further, a fiber is, without limitation, a carbon fiber or a nylon fiber. In a further aspect, a container of the present invention is, without limitation, in the shape of a barrel, a tube, a sphere, a cylinder or other container shape capable of fitting within a bore hole. In an aspect, the container of the present invention, can hold at least 1 ounce, 2 ounces, 3 ounces, 4 ounces, 5 ounces, 6 ounces, 7 ounces, 18 ounces, g ounces, 10 ounces, 11 ounces, 12 ounces, 13 ounces, 14 ounces, 15 ounces, 16 ounces, 1 gallon, 2 gallons, 3 gallons, 4 gallons, 5 gallons, 6 gallons, 7 gallons, 8 gallons, g gallons, 10 gallons, 11 gallons, 12 gallons, 13 gallons, 14 gallons, 15 gallons, 16 gallons, 17 gallons, 18 gallons, 19 gallons, 20 gallons, 21 gallons, 22 gallons, 23 gallons, 24 gallons, 25 gallons, 26 gallons, 27 gallons, 28 gallons, 29 gallons, 30 gallons, 31 gallons, 32 gallons, 33 gallons, 34 gallons, 35 gallons, 36 gallons, 37 gallons, 38 gallons, 39 gallons, 40 gallons, 41 gallons, 42 gallons, 43 gallons, 44 gallons, 45 gallons, 46 gallons, 47 gallons, 48 gallons, 49 gallons, 50 gallons, 51 gallons, 52 gallons, 53 gallons, 54 gallons, 55 gallons, 56 gallons, 57 gallons, 58 gallons, 59 gallons, 60 gallons, 61 gallons, 62 gallons, 63 gallons, 64 gallons, 65 gallons, 66 gallons, 67 gallons, 68 gallons, 69 gallons, 70 gallons, 71 gallons, 72 gallons, 73 gallons, 74 gallons, 75 gallons or more radioactive waste product.

In an aspect, the present invention includes, without limitation, a bore hole that is at least 100 feet, 200 feet, 300 feet, 400 feet, 500 feet, 600 feet, 700 feet, 800 feet, 900 feet, 1000 feet, 1250 feet, 1500 feet, 1750 feet, 2000 feet, 2250 feet, 2500 feet, 2750 feet, 3000 feet, 3250 feet, 3500 feet, 3750 feet, 4000 feet, 4250 feet, 4500 feet, 4750 feet, 5000 feet, 5250 feet, 5500 feet, 5750 feet, 6000 feet, 6250 feet, 6500 feet, 6750 feet, 7000 feet, 7250 feet, 7500 feet, 7750 feet, 8000 feet, 8250 feet, 8500 feet, 8750 feet, 9000 feet, 9250 feet, 9500 feet, 9750 feet, 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet or more below a land surface or a floor surface of a body of water.

In an aspect, a body of water of the present invention is, without limitation, a pond, a lake, a tributary, a river, a stream or an ocean.

In an aspect, the present invention includes, without limitation, a radioactive waste product that is a raffinate or a vitrified waste material, wherein the vitrified waste material comprises, without limitation, a glass and a salt. In an aspect, the present invention contains, without limitation, two or more containers that are linked and wherein, the two or more containers are linked, without limitation, by a cable, a chain, a rope, a flexible tube and/or other material that can be used to connect the two or more containers.

In an aspect, the present invention includes, without limitation, a bore hole that has a depth that is at least 100 feet, 200 feet, 300 feet, 400 feet, 500 feet, 600 feet, 700 feet, 800 feet, 900 feet, 1000 feet, 1250 feet, 1500 feet, 1750 feet, 2000 feet, 2250 feet, 2500 feet, 2750 feet, 3000 feet, 3250 feet, 3500 feet, 3750 feet, 4000 feet, 4250 feet, 4500 feet, 4750 feet, 5000 feet, 5250 feet, 5500 feet, 5750 feet, 6000 feet, 6250 feet, 6500 feet, 6750 feet, 7000 feet, 7250 feet, 7500 feet, 7750 feet, 8000 feet, 8250 feet, 8500 feet, 8750 feet, 9000 feet, 9250 feet, 9500 feet, 9750 feet, 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet or more below a land surface or a floor surface of a body of water.

In an aspect, the present invention includes a gas that is, without limitation, an inert gas, and the inert gas is a noble gas and further, wherein the noble gas is argon or nitrogen. In an aspect, the present invention comprises a container that is stored at a depth where the material into which the bore hole was drilled is impermeable. In an aspect, the present invention comprises a bore hole that is drilled into a crystalline rock and further wherein, without limitation, the crystalline rock is located in the bottom portion of a bore hole. In a further aspect, the crystalline rock of the present invention comprises, without limitation, the bottom 100 feet, 200 feet, 300 feet, 400 feet, 500 feet, 600 feet, 700 feet, 800 feet, 900 feet, 1000 feet, 1250 feet, 1500 feet, 1750 feet, 2000 feet, 2250 feet, 2500 feet, 2750 feet, 3000 feet, 3250 feet, 3500 feet, 3750 feet, 4000 feet, 4250 feet, 4500 feet, 4750 feet, 5000 feet, 5250 feet, 5500 feet, 5750 feet, 6000 feet, 6250 feet, 6500 feet, 6750 feet, 7000 feet, 7250 feet, 7500 feet, 7750 feet, 8000 feet, 8250 feet, 8500 feet, 8750 feet, 9000 feet, 9250 feet, 9500 feet, 9750 feet, 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet or more of the bore hole.

In an aspect, the present invention comprises, without limitation a cover that seals the bore hole is at least 0.25 inches, 0.5 inches, 0.75 inches, 1 inch, 1.25 inches, 1.5 inches, 1.75 inches, 2 inches, 2.25 inches, 2.5 inches, 2.75 inches, 3 inches, 3.25 inches, 3.5 inches, 3.75 inches, 4 inches, 4.25 inches, 4.5 inches, 4.75 inches, 5 inches, 5.25 inches, 5.5 inches, 5.75 inches, 6 inches, 6.25 inches, 6.5 inches, 6.75 inches, 7 inches, 7.25 inches, 7.5 inches, 7.75 inches, 8 inches, 8.25 inches, 8.5 inches, 8.75 inches, 9 inches, 9.25 inches, 9.5 inches, 9.75 inches, 10 inches, 11 inches, 12 inches, 13 inches, 14 inches, 15 inches, 16 inches, 17 inches, 18 inches, 19 inches, 20 inches, 21 inches, 22 inches, 23 inches, 24 inches, 25 inches, 26 inches, 27 inches, 28 inches, 29 inches, 30 inches, 31 inches, 32 inches, 33 inches, 34 inches, 35 inches, 36 inches, 4 feet, 5 feet, 6 feet, 7 feet, 8 feet, 9 feet, 10 feet, 11 feet, 12 feet, 13 feet, 14 feet, 15 feet, 16 feet, 17 feet, 18 feet, 19 feet, 20 feet, 21 feet, 22 feet, 23 feet, 24 feet, 25 feet, 26 feet, 27 feet, 28 feet, 29 feet, 30 feet, 31 feet, 32 feet, 33 feet, 34 feet, 35 feet, 36 feet, 37 feet, 38 feet, 39 feet, 40 feet, 41 feet, 42 feet, 43 feet, 44 feet, 45 feet, 46 feet, 47 feet, 48 feet, 49 feet, 50 feet, 55 feet, 60 feet, 65 feet, 70 feet, 75 feet, 80 feet, 85 feet, 90 feet, 95 feet, 100 feet or more in depth.

In an aspect, the present invention comprises a bore hole wherein the walls of the bore hole are covered so as to create a barrier between each container and the outside wall of the bore hole. In a further aspect, the present invention comprises a lining that extends, without limitation, from below the lowest container to above the container closest to the surface and further, wherein, without limitation, the lining extends from the base of the bore hole to the seal or upper cover above the container closest to the surface and further, wherein, without limitation, the lining is constructed of steel, plastic, a fiber, a composite, and/or a mixture of any of these materials. In a further aspect, the present invention comprises, without limitation, a lower cover that is placed below the container closest to the bottom of the bore hole, further, wherein, without limitation, the lower cover forms a seal from the bottom of the bore hole and further, wherein, without limitation, the seal is not permeable. In a further aspect, the lower cover of the present invention, is constructed, without limitation, of steel, plastic, a fiber, a composite, and/or a mixture of any of these materials.

In an aspect, the present invention comprises, without limitation, one or more containers that can be removed from the bore hole and further, wherein, without limitation, the one or more containers are removed due to a radiation leakage and further, wherein, without limitation, the radiation leakage is detected by the one or more sensors in the bore hole in a location near one or more containers.

In an embodiment, the containers of the present invention include, without limitation, a label and further, wherein, without limitation, each container has a unique label that identifies the contents of each container and further, wherein, without limitation, the label identifies the owner of the container.

In an aspect, a container of the present invention is located sufficiently below a land surface or water surface such that even if all monitoring at a specific site ceased for some reason, there would be virtually no risk to the Earth's environment. In a further aspect, a container of the present invention containing a radioactive waste product in a bore hole is located, without limitation, at least 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet or more below the surface such that even if all monitoring at a specific site ceased for some reason, there would be virtually no risk to any part of the Earth's ecosystem above the uppermost container in the borehole. In a further aspect, the present invention comprises storage of a radioactive waste product in a container in a bore hole that will make it extremely difficult for an unauthorized party to recover and use the radioactive waste for weapons or other destructive purposes as compared to storage in facilities where the container is more accessible.

DETAILED DESCRIPTION

Figure 1:
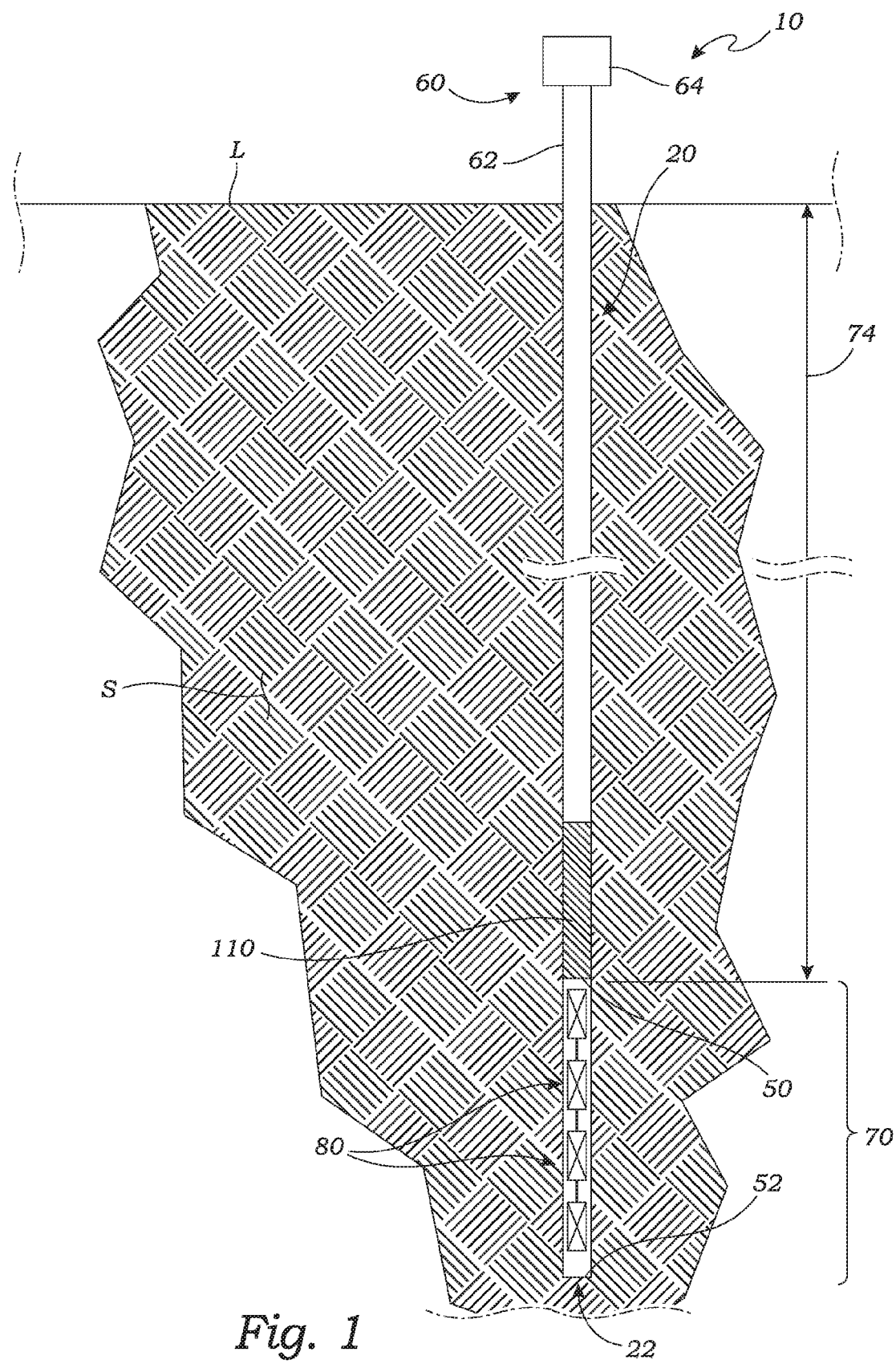
FIG. 1 is a partial schematic view of an exemplary radioactive waste product storage system, in accordance with at least one embodiment.

In an embodiment, the present invention relates to the underground storage of a radioactive waste product in a bore hole drilled into a surface, whether a land surface or a floor surface of a body of water. In a further embodiment, a bore hole can be vertical to the surface from where the hole is drilled, horizontal to the surface from where the hole is drilled, or any angle from where the hole is drilled.

In an embodiment, with reference to the schematic view of FIG. 1, an exemplary radioactive waste product storage system 10 according to aspects of the present invention comprises a bore hole 20 drilled into a land surface L, the bore hole 20 having a bottom 22 at which end is generally defined a container storage area 70 housing one or more containers 80 of radioactive or other such waste, more about which is said below. As indicated, the bore hole 20 is shown as being of an indeterminate depth, though with exemplary dimensions or dimensional ranges as set forth elsewhere herein. Those skilled in the art will appreciate as a threshold matter that all drawing figures being schematics are not to be taken literally or to scale, but instead are merely illustrative of features and aspects of the present invention and non-limiting. Relatedly, while the bore hole 20 is shown as being substantially vertical and the land surface L substantially horizontal, such that the bore hole 20 is substantially perpendicular or 90° thereto, such is merely illustrative and not required. Moreover, while a land surface L is shown as flat, it may instead be sloped or mountainous or any other such terrain, or again may be an underwater floor surface as well into which the bore hole 20 is drilled. The bore hole 20 is drilled through an illustrated geological strata layer S between the land surface L and the bore hole bottom 22, or through a depth including the container storage area 70. While the geological strata S is shown as being substantially homogeneous, continuous and/or monolithic, it will be appreciated that such may not and likely would not be the case, with any such characteristics of the sub-surface strata being within the spirit and scope of the invention.

With continued reference to FIG. 1, in an embodiment, the container storage area 70 of the bore hole 20 is bounded below at the bore bottom 22 by a lower cover 52 and above by an opposite upper cover 50, more about which covers being said below. The location or depth of the upper cover 50, and particularly its bottom, thus defines the effective upper boundary 72 (FIGS. 2A and 2B) of the container storage area 70. The distance, then, from the upper cover 50 or upper boundary 72 of the container storage area 70 to the surface L thus defines the container storage area depth 74, or the distance below the surface or other ecological area to the upper end of the isolated radioactive waste container storage area 70, and the distance below the upper cover 50 to the bore bottom 22 defines the depth of the container storage area 70 itself, which it will be appreciated can vary significantly depending on the context. A layer of non-permeable material 110 may be placed over the upper cover 50 to further seal off the container storage area 70; while such is shown directly over the upper cover 50, it will be appreciated that the non-permeable material 110 may be spaced from the upper cover 50, or as shown in the alternative embodiment of FIGS. 2A and 2B may be positioned at the upper end of the bore hole 20 nearer to the land surface L. As shown, again, one or more waste storage containers 80 may be housed within the container storage area 70 of the bore hole 20. In the illustrated embodiment of FIG. 1, four such containers 80 are stored, though once more it will be appreciated that any number of containers 80 may be stored depending on the size and configuration of the container storage area 70 and of the containers 80. While the containers 80 are shown as being linked and somewhat suspended within the container storage area 70 in an axial or aligned arrangement, it will be appreciated that other arrangements, including stacking or side-by-side, are possible according to aspects of the present invention without departing from its spirit and scope. As also shown in the schematic of FIG. 1, an access facility 60 may be configured at the upper end of the bore hole 20 basically above ground, such as by having a pipe 62 connected to or in communication with the bore hole 20 and terminating opposite the bore hole 20 in an access control 64 for selectively and securely allowing access to the bore hole 20. Other such configurations are possible, such that it is to be understood that the illustrated access facility 60 is merely exemplary.

In an embodiment, a bore hole 20 results from efforts undertaken by the oil and gas industry. The depths of these bore holes can vary in length, with some reaching to depths of more than 20,000 feet below land surfaces or the ocean floor. The inside diameter of the pipe shafts used for the drilling of such bore holes and production can vary from less than 8 inches to 18 inches or larger. In a further embodiment, a bore hole 20 results from efforts undertaken by a research organization or other entity that has a need to drill a hole deep below a surface.

In an embodiment, a bore hole 20 can have a diameter of at least 1 inch, 2 inches, 3 inches, 4 inches, 5 inches, 6 inches, 7 inches, 8 inches, 9 inches, 10 inches, 11 inches, 12 inches, 13 inches, 14 inches, 15 inches, 16 inches, 17 inches, 18 inches, 19 inches, 20 inches, 21 inches, 22 inches, 23 inches, 24 inches, 25 inches, 26 inches, 27 inches, 28 inches, 29 inches, 30 inches, 31 inches, 32 inches, 33 inches, 34 inches, 35 inches, 36 inches, 37 inches, 38 inches, 39 inches, 40 inches, 41 inches, 42 inches, 43 inches, 44 inches, 45 inches, 46 inches, 47 inches, 48 inches, 49 inches, 50 inches, 51 inches, 52 inches, 53 inches, 54 inches, 55 inches, 56 inches, 57 inches, 58 inches, 59 inches, 60 inches or more.

Figure 2A:
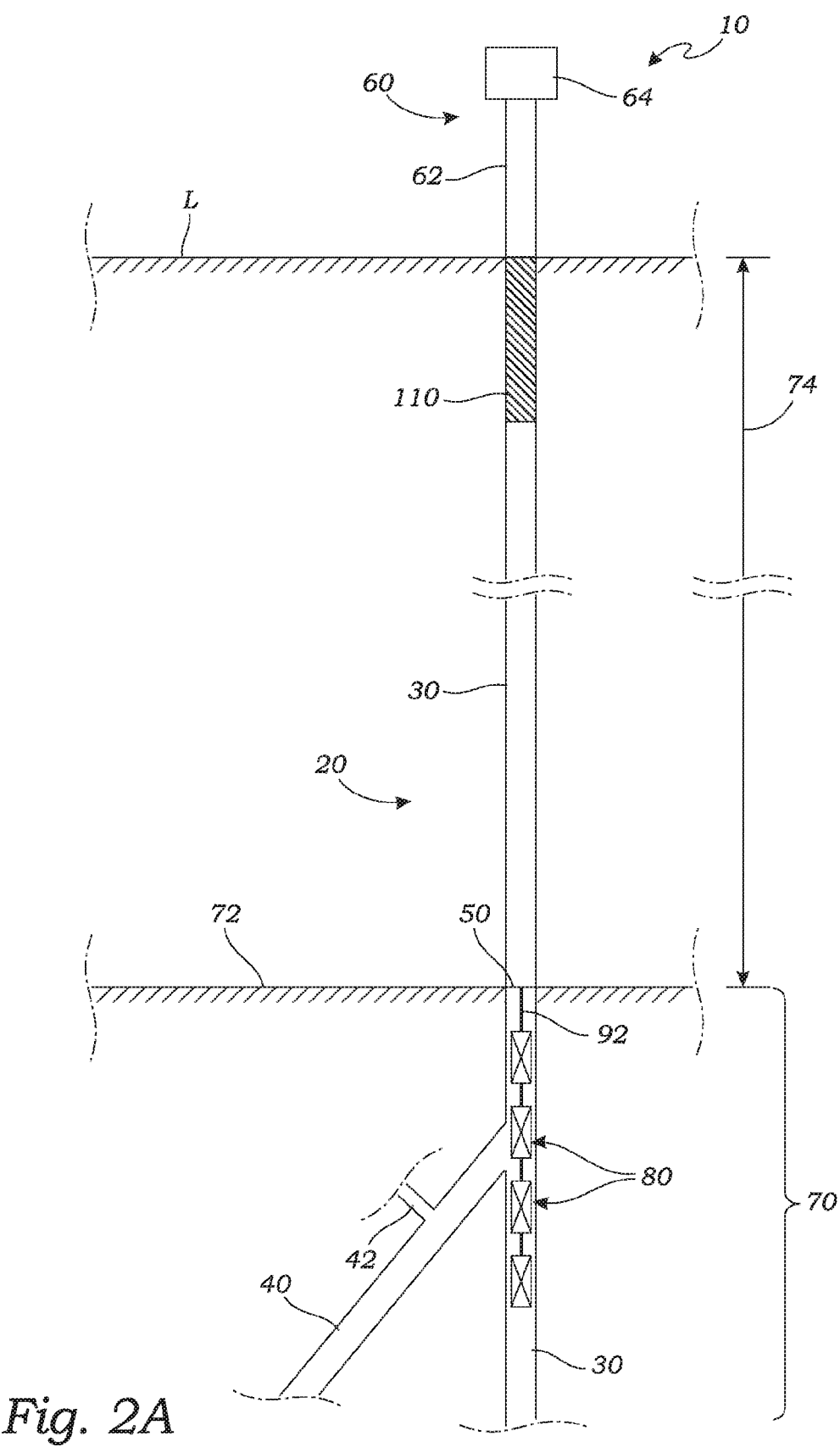
FIG. 2A is a partial schematic view of an alternative exemplary radioactive waste product storage system in a first operational mode, in accordance with at least one embodiment.
Figure 2B:
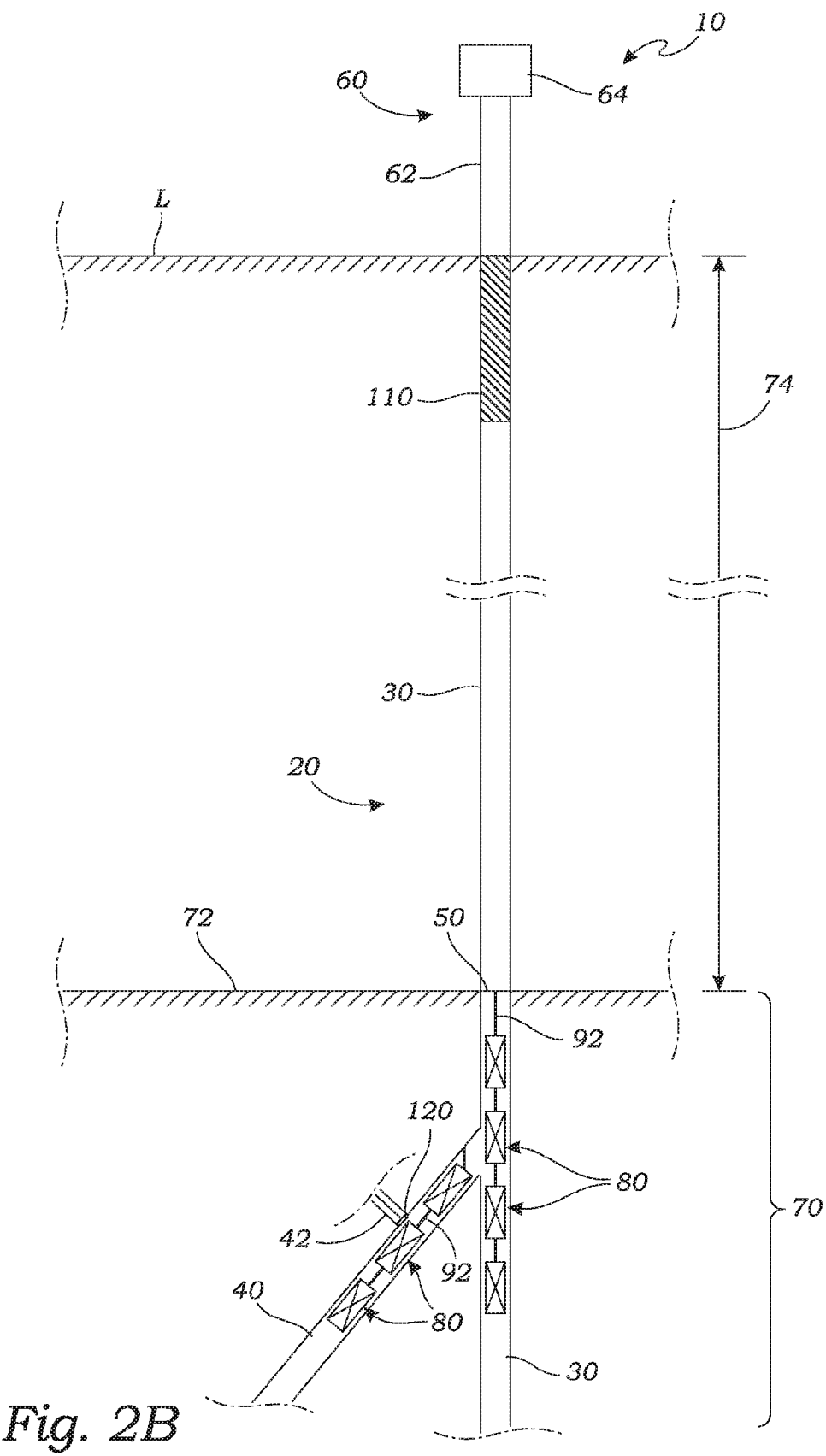
FIG. 2B is a partial schematic view thereof in a second operational mode, in accordance with at least one embodiment.

In an embodiment, a bore hole 20 comprises a main shaft 30 drilled vertical to the land surface L or water floor surface. In a further embodiment, a bore hole 20 comprises a main shaft 30 drilled vertical to the land surface L and then one or more additional branching shaft 40 drilled horizontal to the land surface. In a further embodiment, such as shown in FIGS. 2A and 2B, a bore hole 20 comprises a main shaft 30 first drilled vertical to the land surface L and then one or more additional branching shaft 40 drilled at an angle of at least 1° from the vertical, 2° from the vertical, 3° from the vertical, 4° from the vertical, 5° from the vertical, 6° from the vertical, 7° from the vertical, 8° from the vertical, 9° from the vertical, 10° from the vertical, 11° from the vertical, 12° from the vertical, 13° from the vertical, 14° from the vertical, 15° from the vertical, 16° from the vertical, 17° from the vertical, 18° from the vertical, 19° from the vertical, 20° from the vertical, 21° from the vertical, 22° from the vertical, 23° from the vertical, 24° from the vertical, 25° from the vertical, 26° from the vertical, 27° from the vertical, 28° from the vertical, 29° from the vertical, 30° from the vertical, 31° from the vertical, 32° from the vertical, 33° from the vertical, 34° from the vertical, 35° from the vertical, 36° from the vertical, 37° from the vertical, 38° from the vertical, 39° from the vertical, 40° from the vertical, 41° from the vertical, 42° from the vertical, 43° from the vertical, 44° from the vertical, 45° from the vertical, 46° from the vertical, 47° from the vertical, 48° from the vertical, 49° from the vertical, 50° from the vertical, 51° from the vertical, 52° from the vertical, 53° from the vertical, 54° from the vertical, 55° from the vertical, 56° from the vertical, 57° from the vertical, 58° from the vertical, 59° from the vertical, 60° from the vertical, 61° from the vertical, 62° from the vertical, 63° from the vertical, 64° from the vertical, 65° from the vertical, 66° from the vertical, 67° from the vertical, 68° from the vertical, 69° from the vertical, 70° from the vertical, 71° from the vertical, 72° from the vertical, 73° from the vertical, 74° from the vertical, 75° from the vertical, 76° from the vertical, 77° from the vertical, 78° from the vertical, 79° from the vertical, 80° from the vertical, 81° from the vertical, 82° from the vertical, 83° from the vertical, 84° from the vertical, 85° from the vertical, 86° from the vertical, 87° from the vertical, 88° from the vertical, 89° from the vertical, or 90° from the vertical. As a threshold matter, it is noted that the angle from vertical is considered to be the acute angle in a vertical plane between the branching shaft 40 and the main shaft 30, whether the branching shaft 40 is pointing "up" or "down," such that no obtuse angles, or angles between 90° and 180°, are presented in the foregoing range of angles from the vertical; as such, it will be appreciated that all possible angles of the branching shaft 40 relative to the main shaft 30 are encompassed. While one branching shaft 40 is shown in FIGS. 2A and 2B, it will be appreciated that multiple such branching shafts 40 may connect with a single main shaft 30 and that any such branching shafts 40 can be in different horizontal and vertical planes or at different radial locations and depths relative to each other and the main shaft 30, with any such shafts 40 also being at the same or different angles from vertical relative to each other and having different lengths or terminating at different depths relative to each other. Those skilled in the art will appreciate that all such spoked or branching shaft configurations are possible according to aspects of the present invention without departing from its spirit and scope, such that any particular configuration and arrangement shown or described is to be understood as illustrative and non-limiting. It will be further appreciated that the number and arrangement of such main shaft 30 and any branching shafts 40 will define the overall container storage area 70 and will thus dictate, at least in part, the total number of containers 80 that may be stored in a single facility or system 10, or within a single bore hole 20. In view of such considerations, it will be appreciated that the total capacity of any such system 10 or bore hole 20 according to aspects of the present invention may vary significantly and may be designed and configured for a desired number of containers 80 or amount of radioactive waste product W as measured in total volume or weight or mass or other such metric. In this manner, it will be appreciated that a bore hole 20 having one or more branching shafts 40 into which containers 80 may be placed would potentially have significantly greater storage capacity than would a single main shaft 30.

In an embodiment, the present invention includes the disposal of radioactive waste in containers 80 stored in a bore hole 20. As best seen in the schematic view of FIG. 4, a radioactive waste container 80 may comprise a side wall 82 and opposite upper and lower walls 84, 88 so as to form a complete enclosure. The side and end walls 82, 84, 88 may be any shape, thickness, and material as appropriate to house or contain any radioactive waste product W placed therein, and so may embody any appropriate material or fabrication technology now known or later developed, including the formation of the seals or joints of any of the parts in forming the complete container 80. Extending outwardly from the upper wall 84 is an upper link connector 86 and from the lower wall 88 is a lower link connector 90, which it will be appreciated may be formed in any manner now known or later developed for permanently or temporarily linking adjacent containers 80 in a manner as shown and described herein, including but not limited to the use of links 92 between adjacent containers 80 as by interfacing with or connecting to such illustrative upper and lower link connectors 86, 90. In an embodiment, a container 80 is, without limitation, constructed of a metal, a plastic, a composite, a fiber, including, but not limited to carbon fiber, a nylon fiber or other fiber based material and/or another material capable of storing radioactive material. The length "L" and diameter "D" of a particular container 80 may vary widely as necessary to or appropriate for a particular bore hole or waste storage context. In an embodiment, a container 80 is in the shape of, without limitation, a barrel, a tube, a sphere, a cylinder or other container shape capable of fitting within a bore hole 20. In a further embodiment, a container 80, without limitation, can hold at least 1 ounce, 2 ounces, 3 ounces, 4 ounces, 5 ounces, 6 ounces, 7 ounces, 18 ounces, 9 ounces, 10 ounces, 11 ounces, 12 ounces, 13 ounces, 14 ounces, 15 ounces, 16 ounces, 1 gallon, 2 gallons, 3 gallons, 4 gallons, 5 gallons, 6 gallons, 7 gallons, 8 gallons, 9 gallons, 10 gallons, 11 gallons, 12 gallons, 13 gallons, 14 gallons, 15 gallons, 16 gallons, 17 gallons, 18 gallons, 19 gallons, 20 gallons, 21 gallons, 22 gallons, 23 gallons, 24 gallons, 25 gallons, 26 gallons, 27 gallons, 28 gallons, 29 gallons, 30 gallons, 31 gallons, 32 gallons, 33 gallons, 34 gallons, 35 gallons, 36 gallons, 37 gallons, 38 gallons, 39 gallons, 40 gallons, 41 gallons, 42 gallons, 43 gallons, 44 gallons, 45 gallons, 46 gallons, 47 gallons, 48 gallons, 49 gallons, 50 gallons, 51 gallons, 52 gallons, 53 gallons, 54 gallons, 55 gallons, 56 gallons, 57 gallons, 58 gallons, 59 gallons, 60 gallons, 61 gallons, 62 gallons, 63 gallons, 64 gallons, 65 gallons, 66 gallons, 67 gallons, 68 gallons, 69 gallons, 70 gallons, 71 gallons, 72 gallons, 73 gallons, 74 gallons, 75 gallons, or more of radioactive waste product W.

In an embodiment, a bore hole 20 is, without limitation, at least 100 feet, 200 feet, 300 feet, 400 feet, 500 feet, 600 feet, 700 feet, 800 feet, 900 feet, 1000 feet, 1250 feet, 1500 feet, 1750 feet, 2000 feet, 2250 feet, 2500 feet, 2750 feet, 3000 feet, 3250 feet, 3500 feet, 3750 feet, 4000 feet, 4250 feet, 4500 feet, 4750 feet, 5000 feet, 5250 feet, 5500 feet, 5750 feet, 6000 feet, 6250 feet, 6500 feet, 6750 feet, 7000 feet, 7250 feet, 7500 feet, 7750 feet, 8000 feet, 8250 feet, 8500 feet, 8750 feet, 9000 feet, 9250 feet, 9500 feet, 9750 feet, 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet or more below a land surface L or floor surface of a body of water. In an embodiment, a body of water is a pond, a lake, a tributary, a river, a stream or an ocean.

In an embodiment, a bore hole 20 is, without limitation, left over from an oil or gas well, including, without limitation, a non-producing oil or gas well, or a bore hole drilled for research purposes, including, without limitation, to obtain core samples for research.

Figure 4:
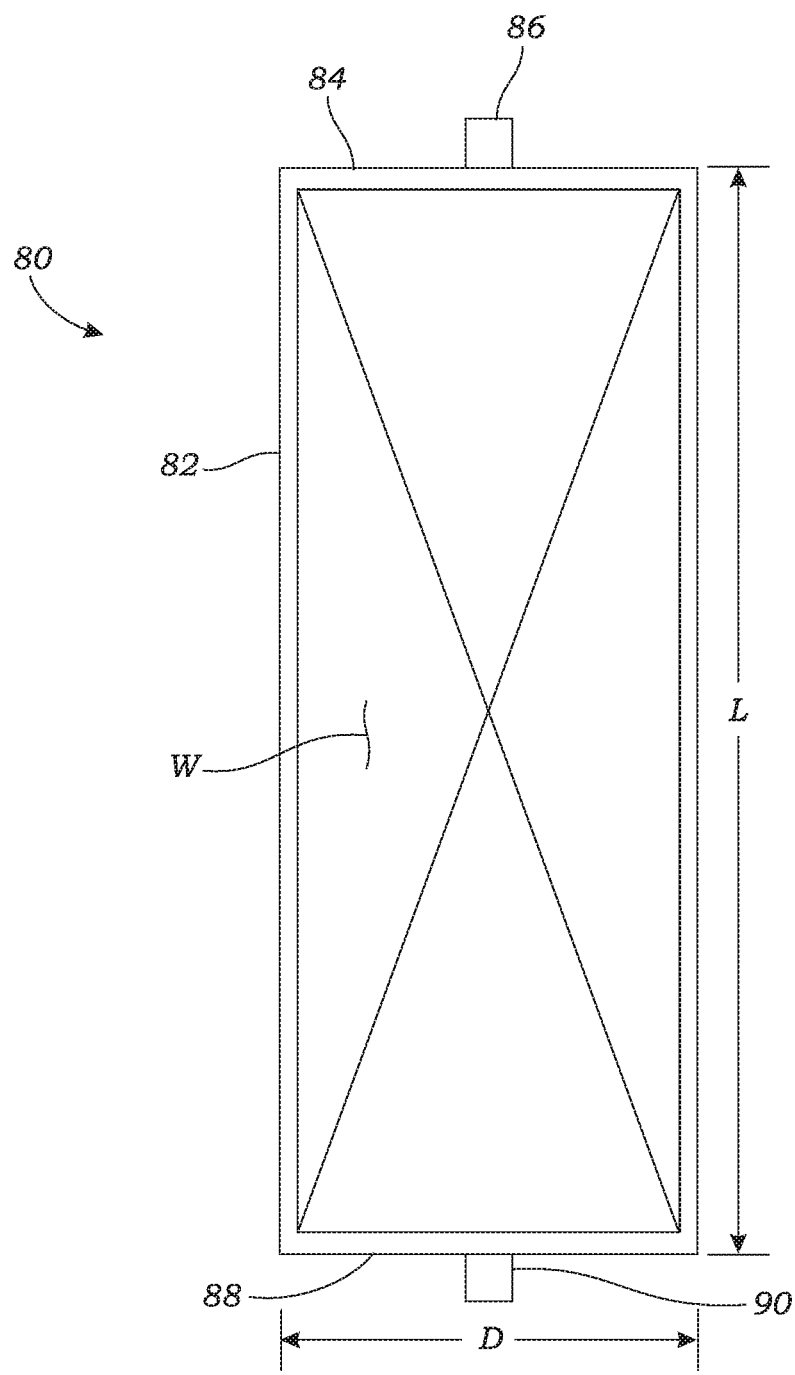
FIG. 4 is a schematic view of an exemplary radioactive waste container thereof, in accordance with at least one embodiment.

In an embodiment, a bore hole 20 provides for the storage of a radioactive waste product W (FIG. 4). In an embodiment, a radioactive waste product W is, without limitation, a raffinate. In a further embodiment, a radioactive waste product W is stored, without limitation, as a vitrified waste. In an embodiment, a radioactive waste product W is stored, without limitation, as a mixture of glass and a salt. In a further embodiment, a mixture of glass and a salt and a radioactive waste product W is a solid, as an encapsulate. In a further embodiment, a radioactive waste product W is stored as individual or bundles of spent nuclear fuel rods.

Figure 3:
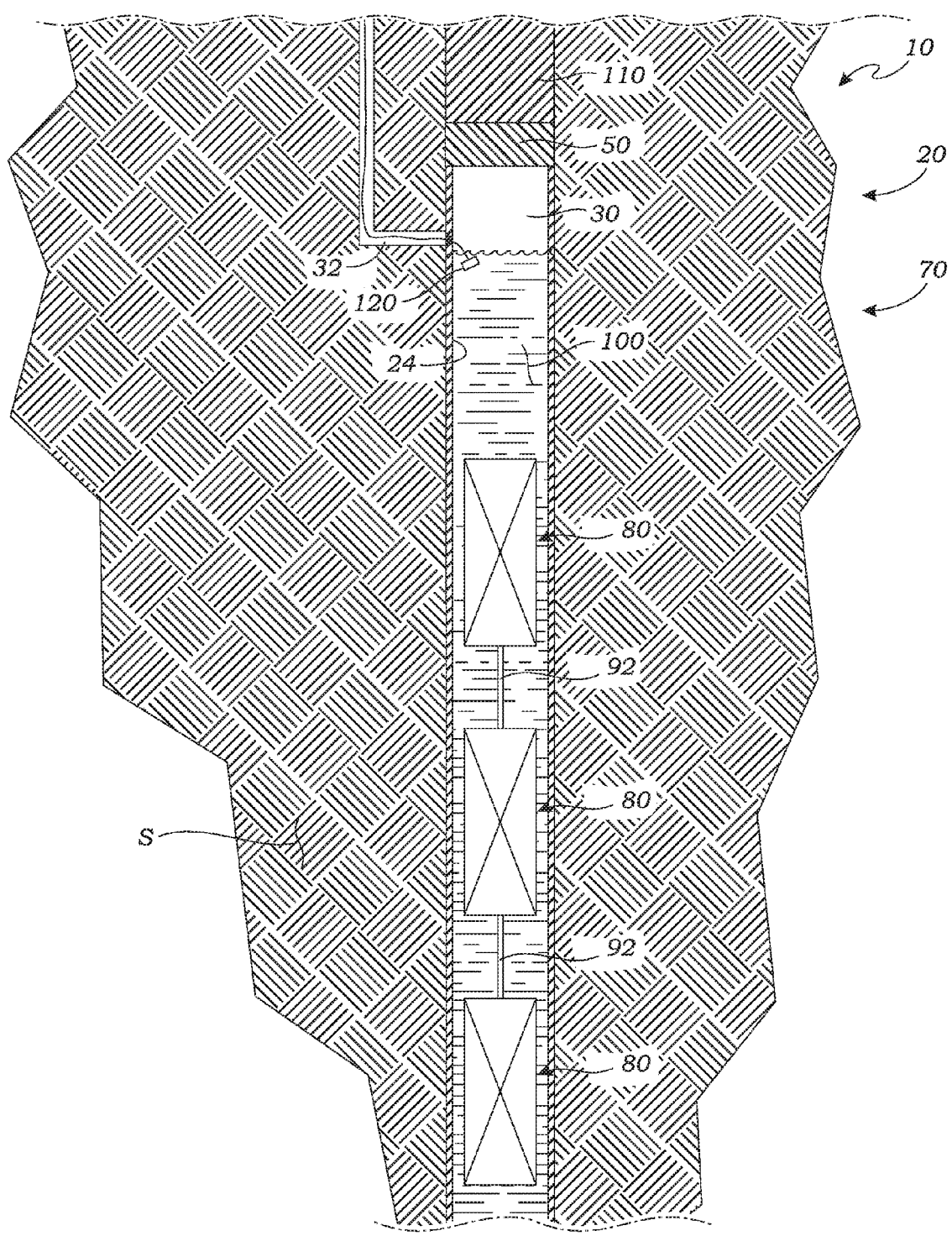
FIG. 3 is a partial schematic view of a further alternative exemplary radioactive waste product storage system, in accordance with at least one embodiment.

In an embodiment, a radioactive waste product W is stored, without limitation, in one container 80. In a further embodiment, a radioactive waste product W is stored, without limitation, in two or more containers 80. In an embodiment, the two or more containers 80 with a radioactive waste product are linked. These containers 80 would be linked mechanically like cars in a train. In an embodiment, the two or more containers, without limitation, are linked by a cable, a chain, a rope, a flexible tube and/or other material that can be used to connect the two or more containers, generally denoted as link 92. By way of further example, the first such link 92 in a chain of containers 80, or the link 92 above the uppermost container 80, may be attached within the bore 20 so as to suspend or secure the chain of containers 80 therein. As illustrated in FIGS. 2A and 2B, in an embodiment, a link 92 secures one or more containers 80 to the upper cover 50 of the main shaft 30 or as in FIG. 2B, a link 92 may instead attach to a wall of the bore hole 20 (here that of a branching shaft 40). Alternatively, as shown in FIGS. 1 and 3, two or more containers 80 may be linked but the chain not attached directly to the bore 20, instead being stacked, suspended, or otherwise positioned within the bore 20 by other means. In an embodiment, the two or more containers 80 are connected by a device or link 92 that allows for the flow of material from a first container 80 to a second container 80 connected to a first container 80. In an embodiment, without limitation, radioactive waste product W to be stored in a bore hole 20 would be vitrified and contained in a container 80 with a corrosion resistant metal (or otherwise converted into any form now known or later developed shown to have higher integrity and corrosion resistance).

In an embodiment, the one or more containers 80 of an exemplary radioactive waste product storage system 10 according to aspects of the present invention, without limitation, are stored in a bore hole 20 at least 100 feet, 200 feet, 300 feet, 400 feet, 500 feet, 600 feet, 700 feet, 800 feet, 900 feet, 1000 feet, 1250 feet, 1500 feet, 1750 feet, 2000 feet, 2250 feet, 2500 feet, 2750 feet, 3000 feet, 3250 feet, 3500 feet, 3750 feet, 4000 feet, 4250 feet, 4500 feet, 4750 feet, 5000 feet, 5250 feet, 5500 feet, 5750 feet, 6000 feet, 6250 feet, 6500 feet, 6750 feet, 7000 feet, 7250 feet, 7500 feet, 7750 feet, 8000 feet, 8250 feet, 8500 feet, 8750 feet, 9000 feet, 9250 feet, 9500 feet, 9750 feet, 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet or more below a land surface or floor surface of a body of water.

In an embodiment, the area of the bore hole 20 located above a container 80 that contains a radioactive waste product W is sealed. In an embodiment, the area of the bore hole 20 located above a container 80 that contains a radioactive waste product W is sealed, to preclude any contact with ocean water, or any other part of an ecosystem, including, without limitation, a body of water, including, without limitation, an underground river, an underground lake or water table. In an embodiment, a bore hole 20 is sealed, without limitation, by placement of an upper cover 50 that seals off the one or more containers 80 that contain a radioactive waste product W from the bore hole 20 above the containers 80. In an embodiment, a bore hole upper cover 50 is sealed so that no material, including, without limitation, a solid, a gas, or a liquid is able to move from the location of the one or more containers 80, generally denoted as the container storage area 70, to the area above the seal or upper cover 50 or from the area above the upper cover 50 to the location of the one or more containers 80. In an embodiment, a gas is, without limitation, an inert gas, including, without limitation, a noble gas, including, without limitation, a nitrogen and/or an argon gas. In an embodiment, a bore hole 20 is sealed through the use of an upper cover 50 that is constructed of, without limitation, steel, plastic, a fiber, including, without limitation, carbon fiber or nylon fiber, a composite, and/or a mixture of any of these materials. In an embodiment, a bore hole 20 is filled with a material above an upper cover 50. In an embodiment, the material 110 above the upper cover 50 is permeable. In another embodiment, the material 110 above the upper cover 50 is not permeable. In an embodiment, a material 110 above an upper cover 50 is, without limitation, a solid, a liquid, or a gas. In an embodiment, a material 110 above an upper cover 50 is, without limitation, established by existing regulations for sealing toxic or mildly toxic contents in a formerly producing oil or gas well. In an embodiment, a material 110 above an upper cover 50 is, without limitation, concrete, a glass, a metal, an inert gas, a non-volatile gas, water, an inert liquid, a non-volatile liquid and/or other plugging material, including, without limitation, plugging material used to plug gas or oil wells. In an embodiment, the material 110 above the upper cover 50 is permanent and cannot be removed or is removable. In an embodiment, the upper cover 50 is removed to access one or more containers 80 in a bore hole 20 for retrieval or other purpose.

In an embodiment, a container 80 containing a radioactive waste product W is stored in a bore hole 20 at a depth where the material such as strata S (FIG. 1) into which the bore hole 20 was drilled is non-permeable. In a further embodiment, the strata material S into which the bore hole 20 is drilled, without limitation, contains crystalline rock. In another embodiment, the crystalline rock is located, without limitation, adjacent to the bottom portion of the bore hole 20. In an embodiment, the crystalline rock comprises at least the bottom 100 feet, 200 feet, 300 feet, 400 feet, 500 feet, 600 feet, 700 feet, 800 feet, 900 feet, 1000 feet, 1250 feet, 1500 feet, 1750 feet, 2000 feet, 2250 feet, 2500 feet, 2750 feet, 3000 feet, 3250 feet, 3500 feet, 3750 feet, 4000 feet, 4250 feet, 4500 feet, 4750 feet, 5000 feet, 5250 feet, 5500 feet, 5750 feet, 6000 feet, 6250 feet, 6500 feet, 6750 feet, 7000 feet, 7250 feet, 7500 feet, 7750 feet, 8000 feet, 8250 feet, 8500 feet, 8750 feet, 9000 feet, 9250 feet, 9500 feet, 9750 feet, 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet or more of the bore hole 20.

In an embodiment, a seal or cover 50, 52 is, without limitation, at least 0.25 inches, 0.5 inches, 0.75 inches, 1 inch, 1.25 inches, 1.5 inches, 1.75 inches, 2 inches, 2.25 inches, 2.5 inches, 2.75 inches, 3 inches, 3.25 inches, 3.5 inches, 3.75 inches, 4 inches, 4.25 inches, 4.5 inches, 4.75 inches, 5 inches, 5.25 inches, 5.5 inches, 5.75 inches, 6 inches, 6.25 inches, 6.5 inches, 6.75 inches, 7 inches, 7.25 inches, 7.5 inches, 7.75 inches, 8 inches, 8.25 inches, 8.5 inches, 8.75 inches, 9 inches, 9.25 inches, 9.5 inches, 9.75 inches, 10 inches, 11 inches, 12 inches, 13 inches, 14 inches, 15 inches, 16 inches, 17 inches, 18 inches, 19 inches, 20 inches, 21 inches, 22 inches, 23 inches, 24 inches, 25 inches, 26 inches, 27 inches, 28 inches, 29 inches, 30 inches, 31 inches, 32 inches, 33 inches, 34 inches, 35 inches, 36 inches, 4 feet, 5 feet, 6 feet, 7 feet, 8 feet, 9 feet, 10 feet, 11 feet, 12 feet, 13 feet, 14 feet, 15 feet, 16 feet, 17 feet, 18 feet, 19 feet, 20 feet, 21 feet, 22 feet, 23 feet, 24 feet, 25 feet, 26 feet, 27 feet, 28 feet, 29 feet, 30 feet, 31 feet, 32 feet, 33 feet, 34 feet, 35 feet, 36 feet, 37 feet, 38 feet, 39 feet, 40 feet, 41 feet, 42 feet, 43 feet, 44 feet, 45 feet, 46 feet, 47 feet, 48 feet, 49 feet, 50 feet, 55 feet, 60 feet, 65 feet, 70 feet, 75 feet, 80 feet, 85 feet, 90 feet, 95 feet, 100 feet, or more in depth.

In an embodiment, the wall of the portion of a bore hole 20 within which one or more containers 80 that contain a radioactive waste product W is stored or covered with a lining 24 so as to create a barrier between each container 80 and the outside wall of the bore hole 20. In an embodiment, a lining 24 extends, without limitation, from the bottom 22 of a bore hole 20 to above the uppermost container 80. In a further embodiment, a lining 24 extends, without limitation, from the bottom 22 of a bore hole 20 or the location of a lower cover 52 to at least the location of a seal or upper cover 50 above the one or more containers 50, or essentially throughout the portion of the bore hole 20 defining the container storage area 70. In an embodiment, a lining 24 around the outside wall of a bore hole 20 is constructed of, without limitation, steel, plastic, a fiber, including, without limitation, carbon fiber or nylon fiber, a composite, and/or a mixture of any of these materials.

In an embodiment, a lower cover 52 is placed on the bottom 22 of a bore hole 20. In an embodiment, a lower cover 52 on the bottom 22 of a bore hole 20 is sealed, without limitation, by placement of the lower cover 52 that seals off the one or more containers 80 that contain a radioactive waste product W from the material S at the bottom 22 of a bore hole 20. In an embodiment, a lower cover 52 on the bottom 22 of a bore hole 20 is sealed so that no material, including, without limitation, a solid, a gas, or a liquid, is able to move from the location of the one or more containers 80, or the container storage area 70, to the area below the seal or lower cover 52 or from the area below the seal or lower cover 52 to the location of the one or more containers 80 or the container storage area 70. In an embodiment, a bore hole 20 is sealed through the use of a lower cover 52 that is constructed of, without limitation, steel, plastic, a fiber, including, without limitation, carbon fiber or nylon fiber, a composite, and/or a mixture of any of these materials. In an embodiment, a bore hole 20 is filled with a material 110 below a cover, including, without limitation, the lower cover 52 and thus to the bottom 22 of a bore hole 20. In an embodiment, the material 110 below a lower cover 52 is permeable. In another embodiment, the material 110 below a lower cover 52 is not permeable. In an embodiment, a material 110 below a lower cover 52 is, without limitation, a solid, a liquid, or a gas. In an embodiment, a material 110 below a lower cover 52 is, without limitation, established by existing regulations for sealing toxic or mildly toxic contents in a formerly producing oil or gas well. In an embodiment, a material 110 below a lower cover 52 is, without limitation, concrete, a glass, a metal, an inert gas, a non-volatile gas, water, an inert liquid, a non-volatile liquid and/or other plugging material, including, without limitation, plugging material used to plug gas or oil wells.

In an embodiment, as shown in FIG. 3, a container 80 that includes a radioactive waste product W that is stored in a bore hole 20 is also immersed in a fluid 100, whether a liquid or a gas. In an embodiment, the liquid or gas fluid 110 in which a container 80 is immersed is able, without limitation, to cool or maintain each container 80. In an embodiment, a fluid 110 in which a container 80 is immersed, is without limitation, water, an inert liquid, including, without limitation, coolant, including, without limitation, a coolant used to cool an engine, including, without limitation, polyethylene glycol and/or a mixture therein.

As shown in FIGS. 2B and 3, in an embodiment, one or more monitors or sensors 120 are placed in a bore hole 20 where a container 80 containing a radioactive waste product W is stored. In an embodiment, a monitor or sensor 120 measures, without limitation, temperature surrounding a container 80, radiation and/or radioactivity levels outside a container 80, including but not limited within a surrounding fluid 100, pH if the one or more containers are stored surrounded by a liquid fluid 100, and/or electrical current in fluid 100 comprised of either a liquid or a gas surrounding a container 80. In an embodiment, a monitor or sensor 120 is used, without limitation, to detect a leak from a container 80 containing a radioactive waste product W. Particularly, it will be appreciated that a container 80 housing a radioactive waste product W may give off radiation even if properly sealed and uncompromised, which base level of radiation may still be established and monitored, whereas radiation emitted from the surrounding fluid 100, or radioactivity of the fluid 100 itself, and thus radiation levels outside of the container 80 and/or radioactivity outside of the container or within the fluid 100 as detected by one or more sensor 120, would indicate a possible leak from or other compromise of a container 80. As shown in FIG. 3, a sensor 120 may be placed in or passed through a main sensor passage 32 that intersects the main shaft 30 of the bore hole 20 in the vicinity of the container storage area 70 and the one or more containers 80 and communicates at its other end with the surface, such as the access facility 60 and its access control 64. The passage may be drilled or otherwise formed along and spaced from the bore hole 20 (here main shaft 30) or pass through or be formed in the upper cover 50 and/or impermeable material 110 employing any technique now known or later developed so as to position the one or more sensors 120 within the bore hole 20, and particularly the container storage area 70 while still providing proper containment or discouraging leakage from the container storage area 70. Alternatively, tubing (not shown) may be provided, whether integral with or separate from the sensor 120 and its cable(s) or wire(s). In an embodiment, one sensor 120 is positioned in each passage 32, 42 or tubing. In a further embodiment, multiple sensors are positioned in each passage 32, 42 or tubing. In a still further embodiment, the one or more sensors 120 are configured to continuously monitor the bore hole 20, in the sense of routine or regular on-going monitoring, which may be literally continuously (as in an "always on" system or sensor(s)) or intermittent (as based on a schedule or prescribed sample interval). Where the containers 80 are immersed in a fluid 100, the sensor 120 is configured to be submerged therein. In the illustrated embodiment, the level of a liquid fluid 100 such as deionized water is just beneath the main sensor passage 32, leaving a space or air gap between the fluid 100 and the upper cover 50. Those skilled in the art will appreciate that such air gap of any size or distance would naturally create or expose surface area in the form of the inside wall of the bore hole 20 or liner 24 over which convective heat transfer is enabled, which heat it will be appreciated may be generated and given off by such radioactive waste product W for many years; additional convective heat transfer happens through the fluid 100 itself as well, but perhaps to a lesser extent or through a different mechanism than the heat dissipated from the surface of the fluid 100 to the air above that then is dispelled through further convection as described. It will be appreciated that in other embodiments the level of fluid 100 may be lower, so as to further increase the size of the air gap above the fluid 100, though preferably always covering the one or more containers 80 housing the radioactive waste product W, or may be higher so as to cover or be above the inlet of the main sensor passage 32 or even substantially fill the container storage area 70 up to the bottom of the upper cover 50. Those skilled in the art will appreciate that all such fluid types and levels are illustrative and non-limiting. Regardless, the sensor 120 may be configured to be permanently or removably positioned within the container storage area 70, or the fluid 100, specifically, and the inlet of the main sensor passage 32 through which the sensor 120 or its cable passes may be configured with a seal or plug or the like to prevent fluid 100 from escaping the container storage area 70 through the main sensor passage 32. Similarly, a sensor 120 may be positioned adjacent to the one or more containers 80 selectively positioned within an additional branching shaft 40 of the bore hole 20 as shown in FIG. 2B. Particularly, a branching sensor passage 42 is shown as intersecting the branching shaft 40 and having a sensor 120 positioned therein so as to sample any fluid 100 (liquid or gas) within the branching shaft 40 that would be indicative of the integrity of the containers 80 positioned therein. Further, while the sensor 120 in FIG. 2B is shown as being immediately adjacent to one or more containers 80 and that in FIG. 3 is shown as being within the fluid 100 some distance above the uppermost container 80, it will be appreciated that such sensors 120 and their location or proximity to the one or more containers 80 can vary depending on a number of factors, including but not limited to, the issue noted above regarding measuring the relative amount or increase of radiation or radioactivity in the fluid 100 as an indicator of a leak versus the radiation inherently present on the outside of even a sealed, uncompromised container 80, which may dictate preferred distances for monitoring, again depending on the type of sensor being used and measurement being made and other factors. Again, more generally, the drawings are not to be taken to scale, such that no actual or relative distances or dimensions are to be assumed or inferred from the schematics, including FIGS. 2B and 3. Once more, any such number, type, configuration, positioning, and use of such sensors 120 now known or later developed is possible according to aspects of the present invention without departing from its spirit and scope. Thus, while a single sensor is illustrated, it will be appreciated that such is merely exemplary and non-limiting. Moreover, it will be appreciated that any such sensors 120 and related passages 32, 42 or tubing or the like may not only be sealed below, in the vicinity of the inlet to the bore hole 20, but above near and/or at the surface or at any intermediate point in between. Those skilled in the art will appreciate any such seals or caps now known or later developed may be employed. By way of further example, in an embodiment, a drilled passage 32, 42 or tubing may not separately pass to or communicate directly with the surface but only some distance above the upper cover 50 and/or impermeable material 110 and then reconnect with or pass through the main shaft 30 of the bore hole 20 to the surface. In any case, it will be further appreciated that sensors may also be placed within any such passages or tubing to further monitor those areas in addition to the container storage area 70 itself, again looking for the presence of fluid and/or radioactivity, with the purpose being to monitor for proper containment. All such configurations are possible according to aspects of the present invention without departing from its spirit and scope.

In an embodiment, charges for storage of a radioactive waste product W in a bore hole 20 of an exemplary radioactive waste product storage system 10 according to aspects of the present invention would be based, without limitation, on the weight and total long-term radioactivity of each container 80. In an embodiment, ownership of the radioactive waste product W in each container 80 would remain with the original owner or responsible party (or new owner or responsible party under any separate transfer arrangement). In a further embodiment, ownership of the radioactive waste product W in each container 80 would transfer to the owner of the bore hole 20 in which the radioactive waste product W is stored.

In an embodiment, the material 110 covering a seal or upper cover 50 located above the container storage area 70 or one or more containers 80 containing a radioactive waste product W can be removed. In an embodiment, the material 110 covering a seal or upper cover 50 located above the one or more containers 80 containing a radioactive waste product W can be removed, without limitation, to allow for the removal of one or more containers 80 containing a radioactive waste product W. The operators of the proposed waste storage facility would not be expected to take ownership of the stored material, and the owners would always be free to remove their particular waste containers 80 for reprocessing or storage elsewhere. Each container 80 would be uniquely identified with its owner or other responsible party.

In an embodiment, a container 80 containing a radioactive waste product W stored in a bore hole 20 contains, without limitation, a label (not shown) to identify and track a specific container 20. In an embodiment, a container 80 is, without limitation, tracked to determine what radioactive waste product W is stored in a bore hole 20. In a further embodiment, a bore hole storage facility meets environmental and nuclear regulatory requirements. In another embodiment, each owner of a container 80 containing a radioactive waste product W would have to personally verify in writing the contents of each radioactive waste container 80 entering or leaving a bore hole 20 used to store radioactive waste product W.

In an embodiment, a container 80 containing a radioactive waste product W in a bore hole 20 is located sufficiently below a land surface L or water floor surface such that even if all monitoring at a specific site ceased for some reason, there would be virtually no risk to the Earth's environment. In a further embodiment, a container 80 containing a radioactive waste product W in a bore hole 20 is located at least 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet, or more below the surface such that even if all monitoring at a specific site ceased for some reason, there would be no risk to the Earth's ecosystem.

In an embodiment, a bore hole 20 for storing radioactive waste would comply fully with all national and international laws and regulations. In a further embodiment, storage of a radioactive waste product W in a container 80 in a bore hole 20 would make it more difficult for an unauthorized party to recover and use the radioactive waste for weapons or other destructive purposes in contrast to radioactive waste product stored in surface facilities or facilities reasonably accessible.

Aspects of the present specification may also be described as follows:

1. A system for the storage of a radioactive waste product, wherein the radioactive waste product is located in a container and where one or more containers are stored in a bore hole drilled beneath a surface and having a bottom, wherein following placement of the one or more containers in the bore hole closer to the bottom, a fluid is added to the bore hole to a height above the upper most container and wherein an upper cover is located above the upper most container and above the fluid to seal in the one or more containers and a non-permeable material is placed above the upper cover.
2. The system of embodiment 1, wherein the bore hole is used to store two or more containers.
3. The system of embodiment 1, wherein the fluid added to the bore hole containing a container is water.
4. The system of embodiment 3, wherein the water is deionized water.
5. The system of embodiment 1, wherein one or more sensors are located in the bore hole near one or more containers.
6. The system of embodiment 5, wherein the one or more sensors detect an increase in radiation, a change in pH and/or electrical charge.
7. The system of embodiment 1, wherein the bore hole has a diameter of at least 1 inch, 2 inches, 3 inches, 4 inches, 5 inches, 6 inches, 7 inches, 8 inches, 9 inches, 10 inches, 11 inches, 12 inches, 13 inches, 14 inches, 15 inches, 16 inches, 17 inches, 18 inches, 19 inches, 20 inches, 21 inches, 22 inches, 23 inches, 24 inches, 25 inches, 26 inches, 27 inches, 28 inches, 29 inches, 30 inches, 31 inches, 32 inches, 33 inches, 34 inches, 35 inches, 36 inches, 37 inches, 38 inches, 39 inches, 40 inches, 41 inches, 42 inches, 43 inches, 44 inches, 45 inches, 46 inches, 47 inches, 48 inches, 49 inches, 50 inches, 51 inches, 52 inches, 53 inches, 54 inches, 55 inches, 56 inches, 57 inches, 58 inches, 59 inches, 60 inches or more.
8. The system of embodiment 1, wherein the bore hole is vertical to a land surface or water floor surface.
9. The system of embodiment 1, wherein the bore hole comprises a main shaft drilled vertical to the surface and then one or more branching shafts drilled horizontal to the surface from the main shaft.
10. The system of embodiment 1, wherein the bore hole comprises a main shaft drilled vertical to the surface and then one or more branching shafts intersecting the main shaft and drilled at an angle of at least 1° from the vertical, 2° from the vertical, 3° from the vertical, 4° from the vertical, 5° from the vertical, 6° from the vertical, 7° from the vertical, 8° from the vertical, 9° from the vertical, 10° from the vertical, 11° from the vertical, 12° from the vertical, 13° from the vertical, 14° from the vertical, 15° from the vertical, 16° from the vertical, 17° from the vertical, 18° from the vertical, 19° from the vertical, 20° from the vertical, 21° from the vertical, 22° from the vertical, 23° from the vertical, 24° from the vertical, 25° from the vertical, 26° from the vertical, 27° from the vertical, 28° from the vertical, 29° from the vertical, 30° from the vertical, 31° from the vertical, 32° from the vertical, 33° from the vertical, 34° from the vertical, 35° from the vertical, 36° from the vertical, 37° from the vertical, 38° from the vertical, 39° from the vertical, 40° from the vertical, 41° from the vertical, 42° from the vertical, 43° from the vertical, 44° from the vertical, 45° from the vertical, 46° from the vertical, 47° from the vertical, 48° from the vertical, 49° from the vertical, 50° from the vertical, 51° from the vertical, 52° from the vertical, 53° from the vertical, 54° from the vertical, 55° from the vertical, 56° from the vertical, 57° from the vertical, 58° from the vertical, 63° from the vertical, 60° from the vertical, 61° from the vertical, 62° from the vertical, 63° from the vertical, 64° from the vertical, 65° from the vertical, 66° from the vertical, 67° from the vertical, 68° from the vertical, 69° from the vertical, 70° from the vertical, 71° from the vertical, 72° from the vertical, 73° from the vertical, 74° from the vertical, 75° from the vertical, 76° from the vertical, 77° from the vertical, 78° from the vertical, 79° from the vertical, 80° from the vertical, 81° from the vertical, 82° from the vertical, 83° from the vertical, 84° from the vertical, 85° from the vertical, 86° from the vertical, 87° from the vertical, 88° from the vertical, 89° from the vertical, or 90° from the vertical.
11. The system of embodiment 1, wherein the container is constructed of a metal, a plastic, a fiber or a composite.
12. The system of embodiment 11, wherein the fiber is a carbon fiber or a nylon fiber.
13. The system of embodiment 1, wherein the container is in the shape of a barrel, a tube, a sphere, a cylinder or other container shape capable of fitting within the bore hole.
14. The system of embodiment 1, wherein the container can hold at least 1 ounce, 2 ounces, 3 ounces, 4 ounces, S ounces, 6 ounces, 7 ounces, 1a ounces, g ounces, 10 ounces, 11 ounces, 12 ounces, 13 ounces, 14 ounces, 1S ounces, 16 ounces, 1 gallon, 2 gallons, 3 gallons, 4 gallons, S gallons, 6 gallons, 7 gallons, 8 gallons, 9 gallons, 10 gallons, 11 gallons, 12 gallons, 13 gallons, 14 gallons, 15 gallons, 16 gallons, 17 gallons, 18 gallons, 19 gallons, 20 gallons, 21 gallons, 22 gallons, 23 gallons, 24 gallons, 2S gallons, 26 gallons, 27 gallons, 2a gallons, 2g gallons, 30 gallons, 31 gallons, 32 gallons, 33 gallons, 34 gallons, 35 gallons, 36 gallons, 37 gallons, 38 gallons, 39 gallons, 40 gallons, 41 gallons, 42 gallons, 43 gallons, 44 gallons, 45 gallons, 46 gallons, 47 gallons, 48 gallons, 49 gallons, 50 gallons, 51 gallons, 52 gallons, 53 gallons, 54 gallons, 55 gallons, 56 gallons, 57 gallons, 58 gallons, 59 gallons, 60 gallons, 61 gallons, 62 gallons, 63 gallons, 64 gallons, 65 gallons, 66 gallons, 67 gallons, 68 gallons, 69 gallons, 70 gallons, 71 gallons, 72 gallons, 73 gallons, 74 gallons, 75 gallons or more radioactive waste product.
15. The system of embodiment 1, wherein the bore hole is at least 100 feet, 200 feet, 300 feet, 400 feet, 500 feet, 600 feet, 700 feet, 800 feet, 900 feet, 1000 feet, 1250 feet, 1500 feet, 1750 feet, 2000 feet, 2250 feet, 2500 feet, 2750 feet, 3000 feet, 3250 feet, 3500 feet, 3750 feet, 4000 feet, 4250 feet, 4500 feet, 4750 feet, 5000 feet, 5250 feet, 5500 feet, 5750 feet, 6000 feet, 6250 feet, 6500 feet, 6750 feet, 7000 feet, 7250 feet, 7500 feet, 7750 feet, 8000 feet, 8250 feet, 8500 feet, 8750 feet, 9000 feet, 9250 feet, 9500 feet, 9750 feet, 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet or more below a land surface or a floor surface of a body of water.
16. The system of embodiment 1, wherein the surface is a floor surface of a body of water selected from the group consisting of a pond, a lake, a tributary, a river, a stream or an ocean.
17. The system of embodiment 1, wherein the radioactive waste product is a raffinate.
18. The system of embodiment 1, wherein the radioactive waste product is a vitrified waste material or bundles of spent nuclear fuel rods.

19. The system of embodiment 18, wherein the vitrified waste material comprises a glass and a salt.
20. The system of embodiment 2, wherein the two or more containers are linked.
21. The system of embodiment 20, wherein the two or more containers are linked by a cable, a chain, a rope, a flexible tube and/or other material that can be used to connect the two or more containers.
22. The system of embodiment 1, wherein the bore hole has a depth that is at least 100 feet, 200 feet, 300 feet, 400 feet, 500 feet, 600 feet, 700 feet, 800 feet, 900 feet, 1000 feet, 1250 feet, 1500 feet, 1750 feet, 2000 feet, 2250 feet, 2500 feet, 2750 feet, 3000 feet, 3250 feet, 3500 feet, 3750 feet, 4000 feet, 4250 feet, 4500 feet, 4750 feet, 5000 feet, 5250 feet, 5500 feet, 5750 feet, 6000 feet, 6250 feet, 6500 feet, 6750 feet, 7000 feet, 7250 feet, 7500 feet, 7750 feet, 8000 feet, 8250 feet, 8500 feet, 8750 feet, 9000 feet, 9250 feet, 9500 feet, 9750 feet, 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet or more below a land surface or a floor surface of a body of water.
23. The system of embodiment 1, wherein the fluid is an inert gas.
24. The system of embodiment 23, wherein the inert gas is a noble gas.
25. The system of embodiment 24, wherein the noble gas is argon or nitrogen.
26. The system of embodiment 1, wherein the container is stored at a depth where geological strata material into which the bore hole was drilled is impermeable.
27. The system of embodiment 26, wherein the geological strata material is a crystalline rock.
28. The system of embodiment 27, wherein the crystalline rock is located in a bottom portion of the bore hole defining a container storage area.
29. The system of embodiment 28, wherein the crystalline rock comprises at least the bottom 100 feet, 200 feet, 300 feet, 400 feet, 500 feet, 600 feet, 700 feet, 800 feet, 900 feet, 1000 feet, 1250 feet, 1500 feet, 1750 feet, 2000 feet, 2250 feet, 2500 feet, 2750 feet, 3000 feet, 3250 feet, 3500 feet, 3750 feet, 4000 feet, 4250 feet, 4500 feet, 4750 feet, 5000 feet, 5250 feet, 5500 feet, 5750 feet, 6000 feet, 6250 feet, 6500 feet, 6750 feet, 7000 feet, 7250 feet, 7500 feet, 7750 feet, 8000 feet, 8250 feet, 8500 feet, 8750 feet, 9000 feet, 9250 feet, 9500 feet, 9750 feet, 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet or more of the bore hole.
30. The system of embodiment 1, wherein the upper cover that seals the bore hole is at least 0.25 inches, 0.5 inches, 0.75 inches, 1 inch, 1.25 inches, 1.5 inches, 1.75 inches, 2 inches, 2.25 inches, 2.5 inches, 2.75 inches, 3 inches, 3.25 inches, 3.5 inches, 3.75 inches, 4 inches, 4.25 inches, 4.5 inches, 4.75 inches, 5 inches, 5.25 inches, 5.5 inches, 5.75 inches, 6 inches, 6.25 inches, 6.5 inches, 6.75 inches, 7 inches, 7.25 inches, 7.5 inches, 7.75 inches, 8 inches, 8.25 inches, 8.5 inches, 8.75 inches, 9 inches, 9.25 inches, 9.5 inches, 9.75 inches, 10 inches, 11 inches, 12 inches, 13 inches, 14 inches, 15 inches, 16 inches, 17 inches, 18 inches, 19 inches, 20 inches, 21 inches, 22 inches, 23 inches, 24 inches, 25 inches, 26 inches, 27 inches, 28 inches, 29 inches, 30 inches, 31 inches, 32 inches, 33 inches, 34 inches, 35 inches, 36 inches, 4 feet, 5 feet, 6 feet, 7 feet, 8 feet, 9 feet, 10 feet, 11 feet, 12 feet, 13 feet, 14 feet, 15 feet, 16 feet, 17 feet, 18 feet, 19 feet, 20 feet, 21 feet, 22 feet, 23 feet, 24 feet, 25 feet, 26 feet, 27 feet, 28 feet, 29 feet, 30 feet, 31 feet, 32 feet, 33 feet, 34 feet, 35 feet, 36 feet, 37 feet, 38 feet, 39 feet, 40 feet, 41 feet, 42 feet, 43 feet, 44 feet, 45 feet, 46 feet, 47 feet, 48 feet, 49 feet, 50 feet, 55 feet, 60 feet, 65 feet, 70 feet, 75 feet, 80 feet, 85 feet, 90 feet, 95 feet, 100 feet or more in depth.
31. The system of embodiment 1, wherein the walls of the bore hole are covered with a lining so as to create a barrier between each container and the bore hole.
32. The system of embodiment 31, wherein the lining extends from below the lowest container to above the container closest to the surface.
33. The system of embodiment 31, wherein the lining extends from the base of the bore hole to the upper cover above the container closest to the surface.
34. The system of embodiment 31, wherein the lining is constructed of steel, plastic, a fiber, a composite, and/or a mixture of any of these materials.
35. The system of embodiment 1, wherein a lower cover is placed below the container closest to the bottom of the bore hole.
36. The system of embodiment 35, wherein the lower cover forms a seal from the bottom of the bore hole.
37. The system of embodiment 36, wherein the seal is not permeable.
38. The system of embodiment 35, where the lower cover is constructed of steel, plastic, a fiber, a composite, and/or a mixture of any of these materials.
39. The system of embodiment 1, wherein one or more containers can be removed from the bore hole.
40. The system of embodiment 39, wherein the one or more containers are removed due to a radiation leakage.
41. The system of embodiment 40, wherein the radiation leakage is detected by one or more sensors in the bore hole in a location near one or more containers.
42. The system of embodiment 1, wherein the one or more containers include a label.
43. The system of embodiment 42, wherein each container has a unique label that identifies the contents of each container.
44. The system of embodiment 42, wherein the label identifies the owner of the container.
45. The system of embodiment 1, wherein the container is located sufficiently below a land surface or water surface such that even if all monitoring at a specific site ceased for some reason, there would be virtually no risk to the Earth's environment.

46. The system of embodiment 1, wherein a container containing a radioactive waste product in a bore hole is located at least 10000 feet, 10250 feet, 10500 feet, 10750 feet, 11000 feet, 11250 feet, 11500 feet, 11750 feet, 12000 feet, 12250 feet, 12500 feet, 12750 feet, 13000 feet, 13250 feet, 13500 feet, 13750 feet, 14000 feet, 14250 feet, 14500 feet, 14750 feet, 15000 feet, 15250 feet, 15500 feet, 15750 feet, 16000 feet, 16250 feet, 16500 feet, 16750 feet, 17000 feet, 17250 feet, 17500 feet, 17750 feet, 18000 feet, 18250 feet, 18500 feet, 18750 feet, 19000 feet, 19250 feet, 19500 feet, 19750 feet, 20000 feet, 20250 feet, 20500 feet, 20750 feet, 21000 feet, 21250 feet, 21500 feet, 21750 feet, 22000 feet, 22250 feet, 22500 feet, 22750 feet, 23000 feet, 23250 feet, 23500 feet, 23750 feet, 24000 feet, 24250 feet, 24500 feet, 24750 feet, 25000 feet, or more below the surface.

47. The system of embodiment 1, wherein storage of a radioactive waste product in a container in a bore hole makes it more difficult for an unauthorized party to recover and use the radioactive waste for weapons or other destructive purposes as compared to storage in facilities where the container is more accessible.

EXAMPLES

The following non-limiting examples are provided for illustrative purposes only in order to facilitate a more complete understanding of the disclosed subject matter. These examples should not be construed to limit any of the embodiments described in the present specification, including those pertaining to a system for the storage of a radioactive waste product.

Example 1

Radioactive waste product currently stored as a liquid in containers near a land surface at a United States government nuclear weapons programs facility, including, without limitation Hanford, Wash., are removed from their current storage site and the radioactive waste is vitrified and formed into cylinders of varying diameter or length or depth. Each cylinder is placed in a container constructed of a non-corrosive metal and sealed in a manner to prevent leakage of the radioactive waste product from the container.

A bore hole of twelve inches diameter and 17500 feet in depth resultant from a deep drilled oil well is modified by placing a seal constructed of a non-corrosive metal on the bottom of the bore hole, followed by the lining of the outside wall of the bore hole with a non-corrosive metal, which is sealed to the cover at the bottom of the bore hole to prevent any leakage of a gas or liquid into the surrounding environment out the bottom. Each container, linked to another container by a chain constructed of a non-corrosive metal, is lowered into the bore hole, wherein the uppermost container is attached by a chain constructed of a non-corrosive metal to a cover that will seal the bore hole and prevent leakage of a radioactive waste product into the surrounding environment out the top. Prior to sealing the cover to the metal wall lining, water is added to the bore hole to a level wherein the water surrounds each of the containers. After the water is added, several sensors are placed into the bore hole at different depths to record the temperature of the water, a change in pH and/or an increase in the amount of radioactivity in the water. After the sensors are placed in the bore hole where the containers are stored, the cover is sealed to the metal wall lining creating a sealed chamber in which the one or more containers containing a radioactive waste product are stored. Following sealing of the cover, concrete is added above the cover to form a non-permeable seal.

Over time, the sensors are monitored to ensure that there is no leakage of the one or more containers stored in the bore hole. In an instance where a leak occurs, the container leaking a radioactive waste product is identified, the concrete is removed along with the cover and the container is then removed from the bore hole. At this point, a radioactive waste product is transferred to a new container and the one or more containers are placed back in the bore hole and the bore hole is resealed and covered with concrete.

Example 2

FIGS. 1 and 2 provide an exemplary overview of the storage of a radioactive waste product in a bore hole, such drawings being of the entire deep radioactive waste product storage system, including a shaft from its top access point, to the waste container storage area that in this embodiment is located at least 5,000 feet or more below the land surface or water floor surface. In this embodiment, the design of the top access would employ advanced safety and security features to provide controlled insertion and retrieval of specially coupled strings of containers containing a radioactive waste product. This part of the storage system is operated only by highly qualified and licensed personnel, specially trained for this particular operation.

This segment of the system would also be fully shielded to provide complete protection of operators from radioactivity emitted from the containers during their insertion and retrieval. It also employs advanced technology for safely controlling and fully accounting for all waste containers shipped to or from the storage site, and for safely moving the contents from properly designed and licensed shipping containers into the waste storage shaft.

The top section of the shaft is sealed with concrete or another impermeable filler material after all waste containers that could be accommodated by a particular storage area have been lowered into place.

Example 3

FIG. 3 is an embodiment that comprises a high level radioactive waste product container storage area, which shows the waste container storage zone, expected to extend for 1,000 or more feet into deep, geologically stable rock. The top of this section of the storage shaft is at a minimum depth of 5,000 to 10,000 feet below any area of possible contact with the Earth's ecosystem, whether land surface or water floor surface. This section also starts at least that far from underground water tables and other geologic areas that should be considered part of the ecosystem.

Existing technology enables access to multiple separate deep storage shafts from a single upper access shaft. Each deep storage shaft is filled with distilled water for cooling of the containers from heat released by residual radioactive decay, through natural convection of this water into upper regions of the storage shaft(s) where the heat would be released to the surrounding rock.

The water surrounding the containers would also be sampled regularly through small diameter tubes connected from each waste storage section to the top of the storage system. This sampling detects any possible leakage of long lived radioactive nuclides from any containers with even tiny flaws, since currently available detection equipment is extremely sensitive. It may also be designed to distinguish harmless short lived radiation from long lived nuclides that properly made containers should fully prevent from escaping.

Example 4

FIG. 4 is an embodiment that comprises a radioactive waste product container, showing the basic design of each waste container containing either vitrified radioactive waste product, or other future structure or substance that may have higher integrity or other features that improve on the current vitrification technology, including spent nuclear fuel rods or bundles of such rods.

As shown in the drawing, each container is clad with a metal that forms the side and end walls that has high corrosion resistance against all possible substances which might later contact the containers after storage operations are complete, and the site is capped and sealed in its uppermost section.

FIG. 4 also shows provision for a mechanical coupling to link the containers for lowering and retrieval operations. Such technology includes, without limitation, the type of equipment already available from the deep drilling oil and/or gas industry to ensure that the couplings will be both mechanically sound, and sufficiently flexible for container insertion and retrieval operations.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of the present invention, which is defined solely by the claims. Accordingly, the present invention is not limited to that precisely as shown and described.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

The invention claimed is:

1. A system for the storage of a radioactive waste product beneath a ground surface, the system comprising:
    a bore hole formed through the ground surface, the bore hole having a wall and a bottom;
    a container storage area defined by the bottom, the wall, and a removable upper cover opposite the bottom;
    a chain of containers comprising a first container connected to a second container through a flexible link, each of the first container and the second container containing the radioactive waste product and both being positioned within the container storage area; and a cable connected to the first container through which the chain of containers is selectively inserted and retrieved from the bore hole, the cable being further attached to one or both of the bore hole and the removable upper cover.

2. The system of claim 1, wherein cooling water fills at least a portion of the container storage area covering the first container and the second container, an air gap being formed between a water surface of the cooling water and the removable upper cover.

3. The system of claim 1, wherein an inert gas is contained within the container storage area.

4. The system of claim 1, wherein one or more sensors are located in the container storage area positioned near one or both of the first container and the second container.

5. The system of claim 4, wherein the one or more sensors pass through one or more sensor passages in selective communication with the bore hole.

6. The system of claim 1, wherein the first container is constructed of a metal, a plastic, a fiber or a composite.

7. The system of claim 1, wherein the first container is in the shape of a barrel, a tube, a sphere, or a cylinder.

8. The system of claim 1, wherein the radioactive waste product is a vitrified waste or bundles of spent nuclear fuel rods.

9. The system of claim 1, wherein the flexible link permits the suspension of the second container beneath the first container when the chain of containers is suspended from the cable.

10. The system of claim 1, wherein the flexible link comprises one or more of a cable, a chain, a rope, or a flexible tube.

11. The system of claim 1, wherein a lining sheaths the wall of the container storage area.

12. The system of claim 11, wherein the lining is constructed of steel, plastic, a fiber, a composite, or any combination thereof.

13. The system of claim 1, wherein a lower cover is positioned in the bore hole between the bottom and the chain of containers, the lower cover further defining a lower boundary of the container storage area.

14. The system of claim 13, wherein the lower cover forms a seal from the bottom of the bore hole.

15. The system of claim 1, wherein one or more sensors in the container storage area are positioned in a location near the chain of containers to detect a radiation leakage so as to trigger removal of all or part of the chain of containers.

16. A system for the storage of a radioactive waste product beneath a ground surface, the system comprising:

a bore hole formed through the ground surface, the bore hole having a wall and a bottom;

a container storage area defined by the bottom, the wall, and a removable upper cover opposite the bottom;

a chain of containers comprising a first container directly linked to a second container through a flexible link, each of the first container and the second container containing the radioactive waste product and both being positioned within the container storage area; and a cable connected to the first container through which the chain of containers is selectively inserted and retrieved from the bore hole;

wherein the flexible link permits the suspension of the second container beneath the first container when the chain of containers is suspended from the cable.

17. The system of claim 16 wherein the cable further is attached to one or both of the bore hole and the removable upper cover.

* * * * *